Patented Mar. 7, 1944

2,343,768

UNITED STATES PATENT OFFICE 2,343,768

PREPARATION OF QUINONES

Carlin F. Gibbs, Cuyahoga Falls, Ohio, assignor to The B. F. Goodrich Company, New York, N. Y., a corporation of New York No Drawing. Application August 8, 1941, Serial No. 405,996

6 Claims. (Cl. 260—396)

This invention relates to the preparation of quinones and pertains specifically to carrying out the reaction of reduced pressure.

It has long been known that quinone and substituted quinones may be prepared from aniline and other aryl amines by the action of manganese dioxide and dilute sulfuric acid, or by the action of potassium dichromate and sulfuric acid, or by some similar oxidizing agent. Phenols and nuclear-substituted phenols may also be oxidized to the corresponding quinones. However, in order to obtain a satisfactory yield of a reasonably pure product it is necessary to carry out the reaction at a temperature below 10° C., preferably below 5° C. In a large scale reaction, temperatures in this range can be maintained only with the use of expensive refrigerating equipment. If the temperature is allowed to rise very far above the preferred range, side-reactions occur to a considerable extent and the yield of pure quinone is sharply reduced. The product is usually separated from the reaction mixture by steam distillation either at normal pressure or at reduced pressure after completion of the reaction.

I have now discovered a method for sythesizing quinones which makes it possible to carry out the reaction at a substantially higher temperature and which makes the reaction substantially a continuous operation instead of a batch process. My new process, by making it possible to carry out the oxidation at a higher temperature without the formation of large amounts of by-products, not only eliminates the necessity for expensive refrigeration, but also decreases greatly the time required for the reaction. In my new process, therefore, a much larger output from a given reactor may be expected than could be obtained in any previously known process.

These advantages may be obtained by the expedient of carrying out the oxidation at reduced pressure, removing the quinone from the reaction mixture as soon as it is formed. If desired, a current of water vapor may be continuously admitted to the reaction mixture to aid in the removal of the quinone, although this step is not necessary. In general, pressures of 15 to 150 mm. of mercury may be used for the reaction with satisfactory results; the temperature used for any given pressure should be high enough to remove the quinone from the reaction mixture as soon as it is formed and high enough to prevent condensation of the water vapor in the reactor. Temperatures between 20° C. and 70° C. are usually satisfactory. It has also been found that it is desirable to add the reactants, for example in the form of aniline sulfate solution and an oxidizing agent, gradually during the course of the reaction, so that there is at no time a very large excess of oxidizing agent over the aniline. By taking out continuously a small amount of the reaction mixture at a point removed from that at which the reagents are introduced, the reaction may be made continuous. It may, however, be found to be more convenient to discontinue temporarily the addition of the reactants from time to time in order to drain or partially drain the reactor. The pressure need not be maintained at a constant value, but may be varied over a wide range. It may even be found desirable to carry out the reaction by alternating short periods of high pressure, even as high as one atmosphere, during which the reagents are added, with periods of low pressure, during which the quinone formed is removed. In this way the quinone may be removed from the reaction mixture before any substantial decomposition has taken place if the periods are sufficiently short, say from 30 seconds up to about an hour.

Instead of adding the aniline sulfate solution and the oxidizing agent in continuous streams, they may be added intermittently in small increments while a low pressure is maintained with substantially the same results.

As a specific example of my invention I have carried out an oxidation as follows. A mixture of 11.6 grams of manganese dioxide and 36 grams of 50% sulfuric acid are placed in a suitable reactor which is maintained at a temperature of 50° to 60° C. by means of a water bath. A mixture of 58.8 grams of manganese dioxide, 50 grams of sulfuric acid, and 40 grams of water is added over a period of about one hour concurrently with a mixture of 24 grams of aniline, 140 grams of 50% sulfuric acid, and 165 grams of water. The pressure inside the reactor is maintained at about 40 mm. of mercury, and a constant stream of water vapor is passed into the bottom of the reactor. The quinone begins to collect in a water-cooled receiver almost immediately after the start of the addition of aniline sulfate, being carried out of the reactor by the stream of water vapor. The yield of quinone is 73% or higher. If desired, the stream of water vapor may be dispensed with, although the reaction is somewhat slower without it.

Although the mechanism of the reaction is not fully understood, the following empirical equations show the relative amounts of the reactants used:

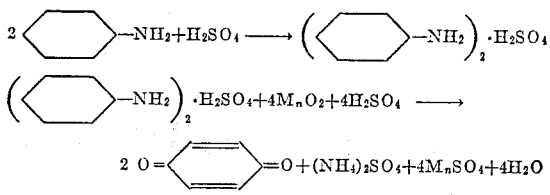

If the same amount of aniline is oxidized by the usual methods, a period of about 24 hours is required for completion of the reaction—24 times as long as is required by my new method. The tremendous increase in capacity of the reactor when the oxidation is carried out by the method of my invention, in addition to the elimination of the necessity for refrigeration, makes the commercial advantages of my method extremely important. This process is not limited to the preparation of benzoquinone itself, but by replacing aniline by other aromatic amines may be employed for the synthesis of toluquinone, the xyloquinones, pseudocumoquinone, the naphthoquinones, 2-methyl-1,4-napthoquinone, and similar substituted quinones which are volatile at reduced pressure either with or without the presence of a stream of water vapor. In addition to the amines, the aryl hydrocarbons themselves, or hydroxy substituted hydrocarbons such as phenol, o-cresol, etc., may be used as starting materials.

No greater excess of oxidizing agent is required when the reaction is carried out at reduced pressure than when it is performed according to the procedures hitherto known. An excess of about 10% or less of manganese dioxide is sufficient, in general. If a much greater excess is used, the advantages obtained by adding the aniline sulfate solution and the oxidizing agent concurrently will be lost.

Although the process of my invention may be used with other oxidizing agents besides manganese dioxide and sulfuric acid, for example, with potassium dichromate and sulfuric acid, to give similar results, at the present time the use of manganese dioxide appears to be most feasible for large scale production because of its availability and its low cost.

Although I have herein disclosed a specific example of my invention, I do not intend to limit myself solely thereto, but only as indicated by the appended claims.

I claim:

1. In the process of manufacturing quinones which are volatile at reduced pressure by oxidizing arylamines in an aqueous medium, the step which comprises carrying out the reaction at a temperature of about 20° to 70° C. while continuously removing the quinones, in the form of vapor, at reduced pressure from the reaction mixture as they are formed.

2. In the process of manufacturing quinones which are volatile at reduced pressure by oxidizing arylamines in an aqueous medium, the step which comprises carrying out the reaction at a temperature of about 20° to 70° C. while continuously removing the quinones, in the form of vapor, at reduced pressure by means of a current of water vapor from the reaction mixture as they are formed.

3. In the process of manufacturing quinone, the step which comprises gradually adding aniline sulfate and a mixture of manganese dioxide with sulfuric acid to the reaction mixture, said reaction mixture being maintained at a temperature between about 20° and 70° C., while continuously removing the quinone, in the form of vapor, at reduced pressure from the reaction mixture as it is formed.

4. In the process of manufacturing quinone, the step which comprises gradually adding aniline sulfate and a mixture of manganese dioxide with sulfuric acid to the reaction mixture, said reaction mixture being maintained at a temperature between about 20° and 70° C., while continuously removing the quinone, in the form of vapor, at reduced pressure by means of a current of water vapor from the reaction mixture as it is formed.

5. In the process of manufacturing quinone, the step which comprises gradually adding aniline sulfate and a mixture of manganese dioxide with sulfuric acid to the reaction mixture, said reaction mixture being maintained at a temperature between about 20° and 70° C., while continuously removing the quinone, in the form of vapor, at a pressure of 15 to 150 mm. of mercury by means of a current of water vapor from the reaction mixture as it is formed.

6. In the process of manufacturing quinone, the step which comprises gradually adding aniline sulfate and a mixture of manganese dioxide with sulfuric acid to the reaction mixture, said reaction mixture being maintained at a temperature between about 20° and 70° C., while continuously removing the quinone, in the form of vapor, at a pressure of 15 to 150 mm. of mercury by means of a current of water vapor from the reaction mixture as it is formed, and removing the other products of the reaction from the reaction mixture substantially continuously during the course of the reaction.

CARLIN F. GIBBS.